(12) United States Patent
Welle et al.

(10) Patent No.: US 11,029,187 B2
(45) Date of Patent: Jun. 8, 2021

(54) FILL LEVEL REFLECTOMETER HAVING A VARIABLE MEASUREMENT SEQUENCE

(71) Applicant: VEGA GRIESHABER KG, Wolfach (DE)

(72) Inventors: Roland Welle, Hausach (DE); Karl Griessbaum, Muehlenbach (DE)

(73) Assignee: VEGA GRIESHABER KG, Wolfach (DE)

(*) Notice: Subject to any disclaimer, the term of this patent is extended or adjusted under 35 U.S.C. 154(b) by 0 days.

(21) Appl. No.: 16/008,456

(22) Filed: Jun. 14, 2018

(65) Prior Publication Data

US 2018/0372526 A1     Dec. 27, 2018

(30) Foreign Application Priority Data

Jun. 21, 2017 (DE) .................. 10 2017 210 381.7
Jun. 21, 2017 (DE) .................. 10 2017 210 382.5
Jun. 21, 2017 (DE) .................. 10 2017 210 383.3
Jun. 21, 2017 (DE) .................. 10 2017 210 402.3
Jun. 21, 2017 (EP) ................................. 17177111
Jun. 21, 2017 (EP) ................................. 17177147

(51) Int. Cl.
*G01F 23/284* (2006.01)
*G01S 7/40* (2006.01)
*G01S 13/88* (2006.01)
*H01Q 1/22* (2006.01)
*H01Q 13/02* (2006.01)

(52) U.S. Cl.
CPC .......... *G01F 23/284* (2013.01); *G01S 7/4008* (2013.01); *G01S 13/88* (2013.01); *G01S 2007/4013* (2013.01); *H01Q 1/225* (2013.01); *H01Q 13/02* (2013.01)

(58) Field of Classification Search
CPC ...................... G01F 23/284; G01F 2007/4013
See application file for complete search history.

(56) References Cited

U.S. PATENT DOCUMENTS

| 4,044,354 A | 8/1977 | Bosher et al. |
| 4,044,355 A | 8/1977 | Edvardsson |

(Continued)

FOREIGN PATENT DOCUMENTS

| CN | 1041654 A | 4/1990 |
| CN | 1234509 A | 11/1999 |

(Continued)

OTHER PUBLICATIONS

T. Saito, et al., "An FM-CW radar module with front-end switching heterodyne receiver", IEEE MTT-S Digest, T-2, vol. 2, XP032363243A, 1992, pp. 713-716.

(Continued)

*Primary Examiner* — Nathaniel J Kolb
(74) *Attorney, Agent, or Firm* — Oblon, McClelland, Maier & Neustadt, L.L.P.

(57) ABSTRACT

A fill level radar device for fill level measurement in accordance with the reflectometer method is provided, including a control circuit that is designed for changing the number of steps, the frequency spacings between the individual steps, the durations of the individual steps, the width of the frequency band, the frequency of the lowest step and/or the frequency of the highest step. The operating sequence can be optimised thereby.

8 Claims, 8 Drawing Sheets

(56) References Cited

U.S. PATENT DOCUMENTS

| | | | |
|---|---|---|---|
| 4,210,023 A | 7/1980 | Sakamoto et al. | |
| 4,503,433 A | 3/1985 | Tomasi | |
| 4,661,817 A | 4/1987 | Bekkadal et al. | |
| 4,847,623 A | 7/1989 | Jean | |
| 5,406,842 A * | 4/1995 | Locke | G01F 23/284 324/643 |
| 5,440,310 A | 8/1995 | Schreiner | |
| 5,629,706 A * | 5/1997 | Bååth | B22D 2/003 342/124 |
| 6,107,957 A | 8/2000 | Cramer et al. | |
| 6,122,602 A * | 9/2000 | Michalski | G01F 23/284 342/118 |
| 6,486,826 B1 * | 11/2002 | Cramer | G01F 23/284 342/102 |
| 6,684,696 B2 | 2/2004 | Schultheiss | |
| 6,864,833 B2 | 3/2005 | Lyon | |
| 7,363,812 B2 | 4/2008 | Eriksson | |
| 7,460,057 B2 | 12/2008 | Fehrenbach | |
| 8,276,444 B2 | 10/2012 | Malinovskiy | |
| 8,319,680 B2 * | 11/2012 | Sai | G01S 13/36 342/124 |
| 8,497,799 B2 * | 7/2013 | Kiernan | G01S 13/88 342/124 |
| 8,872,694 B2 | 10/2014 | Edvardsson et al. | |
| 9,291,443 B2 | 3/2016 | Kleman et al. | |
| 9,329,074 B2 | 5/2016 | Sai | |
| 9,389,113 B2 | 7/2016 | Jirskog et al. | |
| 9,395,229 B2 | 7/2016 | Jirskog et al. | |
| 9,506,796 B2 * | 11/2016 | Edvardsson | G01F 23/284 |
| 9,541,444 B2 * | 1/2017 | Kiernan | G01F 23/284 |
| 9,793,951 B2 | 10/2017 | Henry | |
| 10,260,928 B2 | 4/2019 | Welle | |
| 10,310,056 B2 | 6/2019 | Hughes | |
| 10,416,021 B2 | 9/2019 | Gorenflo et al. | |
| 10,422,682 B2 | 9/2019 | Hengstler | |
| 10,473,509 B2 | 11/2019 | Hengstler | |
| 2005/0052314 A1 | 3/2005 | Spanke et al. | |
| 2005/0166671 A1 | 8/2005 | Peterson et al. | |
| 2005/0168379 A1 | 8/2005 | Griessbaum et al. | |
| 2006/0044145 A1 | 3/2006 | Akerstrom | |
| 2008/0282793 A1 | 11/2008 | Jirskog | |
| 2009/0033543 A1 | 2/2009 | Nilsson | |
| 2011/0163910 A1 * | 7/2011 | Sai | G01F 23/284 342/124 |
| 2011/0248725 A1 | 10/2011 | Mukherjee | |
| 2012/0130509 A1 | 5/2012 | Altendorf | |
| 2012/0169528 A1 * | 7/2012 | Edvardsson | H01Q 1/225 342/124 |
| 2012/0242530 A1 | 9/2012 | Luebbert et al. | |
| 2012/0299767 A1 * | 11/2012 | Kiernan | G01F 23/288 342/124 |
| 2012/0299768 A1 | 11/2012 | Griessbaum | |
| 2013/0213132 A1 | 8/2013 | Wegemann | |
| 2014/0253147 A1 | 9/2014 | Kleman et al. | |
| 2014/0253366 A1 | 9/2014 | Kleman | |
| 2014/0298885 A1 | 10/2014 | Criel et al. | |
| 2015/0116142 A1 | 4/2015 | Jirskog | |
| 2015/0160066 A1 | 6/2015 | Sai | |
| 2015/0177163 A1 | 6/2015 | Edvardsson | |
| 2015/0253176 A1 * | 9/2015 | Jirskog | G01S 13/343 342/58 |
| 2015/0276462 A1 * | 10/2015 | Kiernan | G01S 7/4056 342/124 |
| 2015/0338261 A1 | 11/2015 | Mueller | |
| 2016/0103006 A1 * | 4/2016 | Edvardsson | G01S 13/88 342/124 |
| 2016/0115784 A1 | 4/2016 | Littleford et al. | |
| 2016/0146658 A1 | 5/2016 | Littleford | |
| 2018/0031687 A1 | 2/2018 | Mueller | |
| 2018/0164145 A1 | 6/2018 | Daufeld et al. | |
| 2018/0262319 A1 | 9/2018 | Xing | |
| 2018/0328771 A1 | 11/2018 | Edvardsson | |
| 2020/0249068 A1 | 8/2020 | Michalski | |

FOREIGN PATENT DOCUMENTS

| | | |
|---|---|---|
| CN | 101140180 A | 3/2008 |
| CN | 101322015 A | 12/2008 |
| CN | 101485074 A | 7/2009 |
| CN | 101492750 A | 7/2009 |
| CN | 101666668 A | 3/2010 |
| CN | 202382811 U | 8/2012 |
| CN | 102763001 A | 10/2012 |
| CN | 102798436 A | 11/2012 |
| CN | 103017868 A | 4/2013 |
| CN | 104713617 A | 6/2015 |
| CN | 104897242 A | 9/2015 |
| CN | 1113003 A | 10/2015 |
| CN | 104977063 A | 10/2015 |
| CN | 105102942 A | 11/2015 |
| CN | 205037943 U | 2/2016 |
| DE | 694 33 175 T2 | 6/2004 |
| DE | 102009057191 A1 | 6/2011 |
| DE | 10 2015 109 463 A1 | 12/2016 |
| EP | 0 928 974 A2 | 7/1999 |
| EP | 1 707 982 A1 | 10/2006 |
| EP | 1 707 983 A1 | 10/2006 |
| EP | 1 992 922 A2 | 11/2008 |
| EP | 1 992 923 A2 | 11/2008 |
| EP | 2 166 671 A2 | 3/2010 |
| EP | 2 293 096 A2 | 3/2011 |
| EP | 2 293 096 A3 | 3/2011 |
| EP | 2 631 612 A2 | 8/2013 |
| EP | 2 491 355 B1 | 12/2017 |
| JP | 2013-253937 A | 12/2013 |
| KR | 10-2015-0126532 A | 11/2015 |

OTHER PUBLICATIONS

Office Action dated Apr. 15, 2020 in U.S. Appl. No. 16/011,274, 13 pages.

Office Action dated May 15, 2020 in U.S. Appl. No. 16/014,501, 9 pages.

Office Action dated Aug. 28, 2020 in co-pending U.S. Appl. No. 16/014,634, 23 pages.

Notice of Allowance dated Sep. 3, 2020 in co-pending U.S. Appl. No. 16/014,501, 11 pages.

Office Action dated Sep. 22, 2020 in co-pending U.S. Appl. No. 16/011,274, 13 pages.

Office Action dated Oct. 6, 2020 in co-pending U.S. Appl. No. 16/014,680, 11 pages.

Office Action dated Feb. 4, 2021 in co-pending U.S. Appl. No. 16/011,274, 14 pages.

Chinese Office Action dated Mar. 24, 2021 in corresponding Chinese Patent Application No. 201810629191.6 (with English translation), citing documents AO and AP therein, 16 pages.

Chinese Office Action dated Mar. 22, 2021 in corresponding Chinese Patent Application No. 201810643215.3 (with English translation) citing documents AA, AB and AO-AQ therein, 15 pages.

Chinese Office Action dated Mar. 24, 2021 in corresponding Chinese Patent Application No. 201810642348.9 (with English translation and English Summary of Office Action), citing documents AA, AB and AD-AH therein, 16 pages.

Chinese Office Action dated Mar. 23, 2021 in corresponding Chinese Patent Application No. 201810646168.8 (with English translation and English summary of Office Action), citing documents AI-AL therein, 19 pages.

Chinese Office Action dated Mar. 26, 2021 in corresponding Chinese Paten Application No. 201810643156.X (with English translation and English summary of Office Action), citing documents AM through AS therein, 16 pages.

* cited by examiner

FILL LEVEL REFLECTOMETER HAVING A VARIABLE MEASUREMENT SEQUENCE

CROSS-REFERENCE TO RELATED APPLICATIONS

This application claims the benefit of the filing date of European Patent Applications No. 17 177 111.6, filed on 21 Jun. 2017, and No. 17 177 147.0 filed on 21 Jun. 2017, the entire contents of each of which are hereby incorporated herein by reference, and of German Patent Applications No. 10 2017 210 383.3, filed on 21 Jun. 2017, No. 10 2017 210 381.7, filed on 21 Jun. 2017, No. 10 2017 210 382.5, filed on 21 Jun. 2017, and No. 10 2017 210 402.3, filed on 21 Jun. 2017, the entire contents of each of which are hereby incorporated by reference.

FIELD

The invention relates to fill level measurement technology. In particular, the invention relates to a fill level measurement device designed for fill level measurement in accordance with the reflectometer method, to a method for fill level determination in accordance with the reflectometer method, to a program element and to a computer-readable medium.

BACKGROUND

Fill level radar devices determine the fill level from the delay time of electromagnetic waves which are transmitted from the measurement device as transmission signals and re-received after being reflected on the filling material. The distance between the measurement device and the filling material can be determined from the delay time of the electromagnetic waves, and a degree of filling of a container equipped with the measurement device can in turn be established from said distance.

The transmitted electromagnetic waves, also referred to in the following as electromagnetic transmission signals, can be high-frequency waves or microwaves. Said waves can be emitted freely from the measurement device towards the filling material or, alternatively, can be guided back and forth by means of a waveguide.

Various measurement methods for measuring the delay time of the electromagnetic waves between the transmission and reception thereof are known. In principle, they can be grouped into methods which measure the delay time of very short transmission pulses, usually referred to as pulsed radar methods, and measurement principles which are based on modulating continuously transmitted signals. Said methods, which are known as CW (continuous wave) radar methods, transmit constantly throughout the duration of a measurement process, which is also described in the following as a measurement cycle or a fill level measurement phase, the transmission duration within one measurement cycle thus typically being orders of magnitude longer than the delay time of the transmission signals, compared with the pulsed method.

In this case, the delay time can be indirectly determined by modulating the transmission and reception waves. Linear frequency modulation is used for this purpose in the FMCW (frequency-modulated continuous wave) method.

SUMMARY

The present disclosure describes increasing the measuring accuracy of fill level radar devices.

The described embodiments, together with further advantages, will be best understood by reference to the following detailed description taken in conjunction with the accompanying drawings.

A described embodiment relates to a fill level measurement device in the form of a fill level radar that is designed to for fill level measurement in accordance with the reflectometer method, and which is described in more detail below.

The fill level measurement device comprises a signal source assembly designed for producing an electromagnetic transmission signal during a fill level measurement phase. As a rule, said fill level measurement phase is exactly long enough to make it possible to determine the fill level from the transmission signal with sufficient accuracy. Typical measurement times are well under one second.

In this case, the transmission signal is frequency-modulated in steps, each step having a constant frequency over a period of time that is more than twice the delay time of the transmission signal from the signal source assembly to the filling material. The individual constant frequencies of the transmission signals (i.e., the steps) are distributed within a defined frequency band, such that the lowest step is in the lower range of the frequency band, for example at the lower edge thereof, and the highest step is in the upper range of the frequency band, for example at the upper edge thereof.

A control circuit is provided, which is designed to change the number of steps, the frequency spacings between the individual steps, the duration of the individual steps, the bandwidth of the frequency band, the frequency of the lowest step and/or the frequency of the highest step. This change typically takes place after a fill level measurement phase has ended. However, it is also possible for some or a plurality of the above-described values to be changed during a fill level measurement phase, for example because it has been found that other parameters should be set in the middle of the frequency band so as to increase the measuring accuracy or to save energy.

According to a described embodiment, the control circuit is designed to split the electromagnetic transmission signal into at least two partial signals that are temporally separated from one another, between the transmission of which partial signals towards the filling material signal processing of the previously received signals can be carried out. In particular, it is possible for a high-frequency unit of the signal source assembly to be deactivated during this time period. As a result, energy is saved and the measurement is continued when sufficient energy is collected again.

This is useful in particular when using a 4 to 20 mA two-wire system, in which the available energy is inherently very limited. According to a described embodiment, the fill level radar device is designed for connection to a 4 to 20 mA two-wire loop, by means of which the fill level radar device is supplied with the energy necessary for the measurement, and by means of which the device sends measurement data and can receive parameterisation data from an external location.

According to a further described embodiment, the frequencies of the steps of the second partial signal are between the frequencies of the steps of the first partial signal. For example, it is possible for the steps of the first partial signal to be distributed so as to be equidistant, and for the steps of the second partial signal to also be distributed so as to be equidistant, but with the frequency of a step of the second partial signal in each case being between the frequencies of two adjacent steps of the first partial signal.

According to a further described embodiment, the steps in the central region of the transmission signal last longer than the steps in the edge regions of the transmission signal. The signal-to-noise ratio can thus be increased in the central region.

According to a further described embodiment, the control circuit is designed for carrying out the change using characteristic variables which have been input by a user and/or which have been detected by the fill level measurement device. It may thus be found, for example, following a fill level measurement, that an improvement in the signal-to-noise ratio is desirable. Accordingly, the duration of the individual steps can be increased. It may also prove necessary to decrease the echo width, whereupon the bandwidth of the transmission signal can be increased. If the total available energy is no longer sufficient to carry out a complete measurement cycle without interruption, the transmission signal can be split into a plurality of portions which are passed through temporally separately from one another. Energy can be collected in the pauses therebetween.

A measuring phase or measuring cycle may start at the time at which the signal source starts to generate the stepped electromagnetic transmission signal and the transceiver circuit starts to transmit the transmission signal towards the filling material. The measuring phase may stop when all data required for fill level determination has been acquired, i.e., when the device is ready to determine the fill level.

In particular, the fill level measurement device can be designed for heterodyne mixing of the received reflected transmission signal with a signal from a further signal source assembly so as to form a reflection-dependent reception signal from which the fill level can be determined.

According to a further described embodiment, the fill level measurement device is designed to detect exactly one fill level measured value during the fill level measurement phase.

According to said embodiment, the length of the fill level measurement phase is precisely such that the fill level measured value can be detected with sufficient accuracy.

A further aspect of the described embodiments relates to a method for fill level determination in accordance with the reflectometer principle, in which an electromagnetic transmission signal that is frequency-modulated in steps is generated during a fill level measurement phase.

Each step has a constant frequency over a time period that is more than twice the delay time of the transmission signal from the signal source assembly to the filling material. In this case, the individual constant frequencies of the transmission signal are distributed within a defined frequency band. The number of steps (fixed in advance), the frequency spacing between the individual steps, the duration of the individual steps, the width of the frequency band, the frequency of the lowest step and/or the frequency of the highest step are changed during or after the transmission of the transmission signal. This change occurs in response to a user input and/or on the basis of knowledge collected by the fill level measurement device during the measurement.

A further aspect of the described embodiments relates to a program element which, when executed on a processor of a fill level measurement device, prompts the fill level measurement device to carry out the steps described above.

A final aspect of the described embodiments relates to a computer-readable medium on which the above-described program element is stored.

A basic concept of the invention can be considered to be that the fill level measurement device is able to change the transmission signal that is used for the measurement and is generated by a synthesiser (signal source assembly), taking into account the number of generated signal frequencies and/or the number of lengths of time of the generated transmission signals between a first measurement cycle and a second measurement cycle, so as to achieve behaviour that is optimised for each application. Skillfully specifying the transmission frequencies to be controlled and their respective lengths of time can result in an operating sequence that is optimised with respect to the particular application of the measurement device.

BRIEF DESCRIPTION OF THE DRAWINGS

Embodiments are described in the following with reference to the drawings. Where the same reference signs are used in the drawings, said signs denote the same or similar elements. The drawings are schematic and not to scale.

DETAILED DESCRIPTION OF EMBODIMENTS

Figure 1:
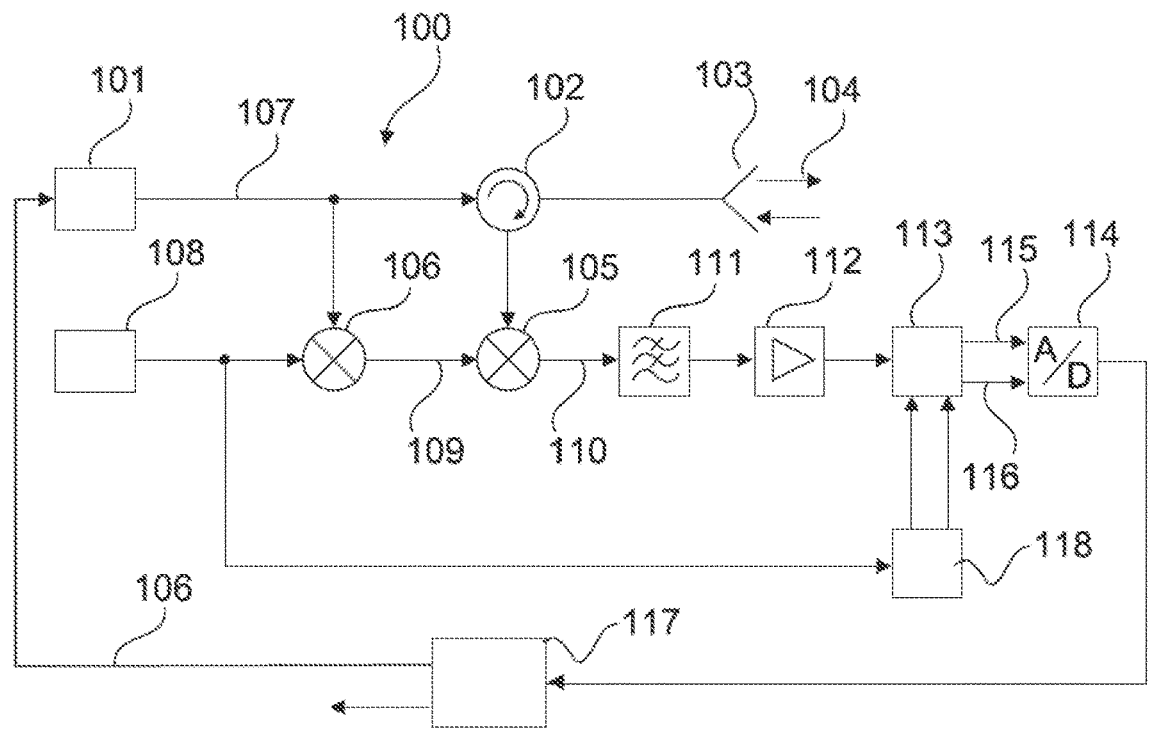
FIG. 1 is a functional block diagram of a fill level radar device.

FIG. 1 is a functional block diagram of an alternative measurement method to the known FMCW method described above. This differs from the apparatuses used thus far inter alia by way of a heterodyne circuit design which provides for reception mixing of the received signal with a local oscillator signal of a different frequency, so as to result in an intermediate frequency at the mixer output.

Similarly to the FMCW method, a transmission signal is generated by the synthesiser 101, which signal is guided by means of the circulator 102 or directional coupler 102 to the antenna 103 and emitted thereby. In this case, the antenna 103 converts a high-frequency signal, supplied by means of a line, into an electromagnetic wave 104 which is either emitted freely or, alternatively, guided by means of a waveguide, for example a hollow waveguide or a single-wire or multi-wire waveguide, towards the reflector. The wave reflected at the reflector arrives back at the antenna 103, at least in part, and is converted back into a line-guided reception signal. Said signal then reaches the receiving mixer 105 by means of the circulator 102 or directional coupler 102. The circulator or directional coupler 102 is a component part that is known in the field of radar fill level measurement and that can advantageously be used in monostatic operation, i.e., when the same antenna is used for transmission and reception. Said circulator or directional coupler comprises at least three ports and guides signals, in a direction-selective manner, from one port predominantly to a second port, while the third port is decoupled in this case. For bistatic operation, which is also possible but is not shown in more detail here, two separate antennae are used for transmission and reception. In this case, the circulator or directional coupler 102 is omitted and the signal travels from the synthesiser 101 to the transmitting antenna and from the receiving antenna to the receiving mixer 105.

The synthesiser 101 is used for generating different sine waves of different frequencies in a frequency band that is fixed in advance, the frequency remaining at a fixed value for a particular period of time and then jumping to a new fixed frequency value. This can take place in the form of stepped linear frequency modulation for example. For this purpose, said synthesiser contains a tuneable oscillator, for example a VCO (voltage-controlled oscillator). Said synthesiser also advantageously contains a control loop and a reference oscillator. The control loop, for example a PLL (phase-locked loop), controls the frequency of the tenable oscillator, such that said frequency remains in a particular, settable ratio with respect to the frequency of the reference oscillator.

The frequency ratio is advantageously set digitally, for example in a manner controlled by means of a controller circuit 117, which has also been referred to in the present context as a control circuit, via the signal 106, and usually involves switching one or more divider components that divide the frequency of the reference oscillator and/or of the tuneable oscillator. In this case, non-integer dividers, referred to as fractional n dividers, are also possible in addition to simple integer dividers. Using dividers of this type makes it possible to adjust the output frequency of the synthesiser 101 in very small steps over a relatively large frequency range.

A portion of the output signal of the synthesiser 101 is diverted, for example via a power splitter (not shown in more detail) or a coupler, so as to form the local oscillator signal 109 for the receiving mixer 105. For this purpose, the diverted synthesiser signal 107 is mixed with an output signal of a fixed-frequency oscillator 108 by means of the mixer 106, causing various new frequency portions, such as the sum frequency and the difference frequency, to result from the two input frequencies. Both can optionally be used as the above-mentioned local oscillator signal of the receiving mixer 105 following corresponding band filtering (not shown here).

Inter alia the difference frequency of the two signals results in the receiving mixer 105, from the local oscillator signal and the reception signal, said difference frequency thus corresponding exactly to the output frequency of the fixed-frequency oscillator 108. Said output signal, referred to as intermediate frequency signal 110, of the receiving mixer 105 has, in addition to the above-mentioned fixed frequency, a phase position which defines, together with the amplitude of the intermediate frequency signal, a complex characteristic variable of the reflection coefficient of all the reflectors involved in reflecting the wave. In other words, the phase position of the intermediate frequency signal is dependent on the mutual phase position of the local oscillator signal and the reception signal. The phase position of the reception signal in turn depends on the distance travelled by the transmitted or received wave, and thus on the distance of the reflector, whereas the phase position of the local oscillator signal depends on the synthesiser output signal and thus on the transmitted signal. The phase position of the intermediate frequency signal is therefore ultimately dependent only on the phase between the transmission signal and the reception signal, and thus on the distance of the reflector. Said intermediate frequency signal undergoes band filtering in the band-pass filter 111 and is amplified in the intermediate frequency amplifier 112 so as to increase the signal-to-noise ratio. In order to determine the complex reflection coefficient from the intermediate frequency signal that is present in analogue form, the intermediate frequency signal can be split into the complex constituents thereof, i.e. the real part and the imaginary part, by using a phase-shift circuit 118 and a quadrature demodulator 113, and the two components can then undergo analogue-to-digital conversion separately. An advantage of using the quadrature demodulator is that the real part and the imaginary part of the intermediate frequency signal are present as baseband signals 115, 116, i.e., no longer contain any high-frequency portions and are therefore very easy to digitalise.

As already mentioned, the measured values are processed further inside the controller circuit 117 after the analogue-to-digital conversion by the analogue-to-digital converter 114. In addition to program code for evaluating the digitalised measurement signals, the circuit part 117 in particular also contains program code for sequence control of a measurement cycle, i.e., for initiating wave transmission, frequency control and general control of the transceiver circuit 100.

As described, the circuit layout shown in FIG. 1 makes it possible to determine a complex reflection coefficient. Said complex reflection coefficient is composed of all the reflection portions that are contained in the received signal. If a plurality of reflectors are involved, the individual signal portions can no longer be separated and it is not possible to determine the distance of the individual reflectors. However, if this measurement is repeated at further set output frequencies within a particular frequency band, a digital value table consisting of the set frequency values and the corresponding complex reflection coefficients can be created.

Figure 2:
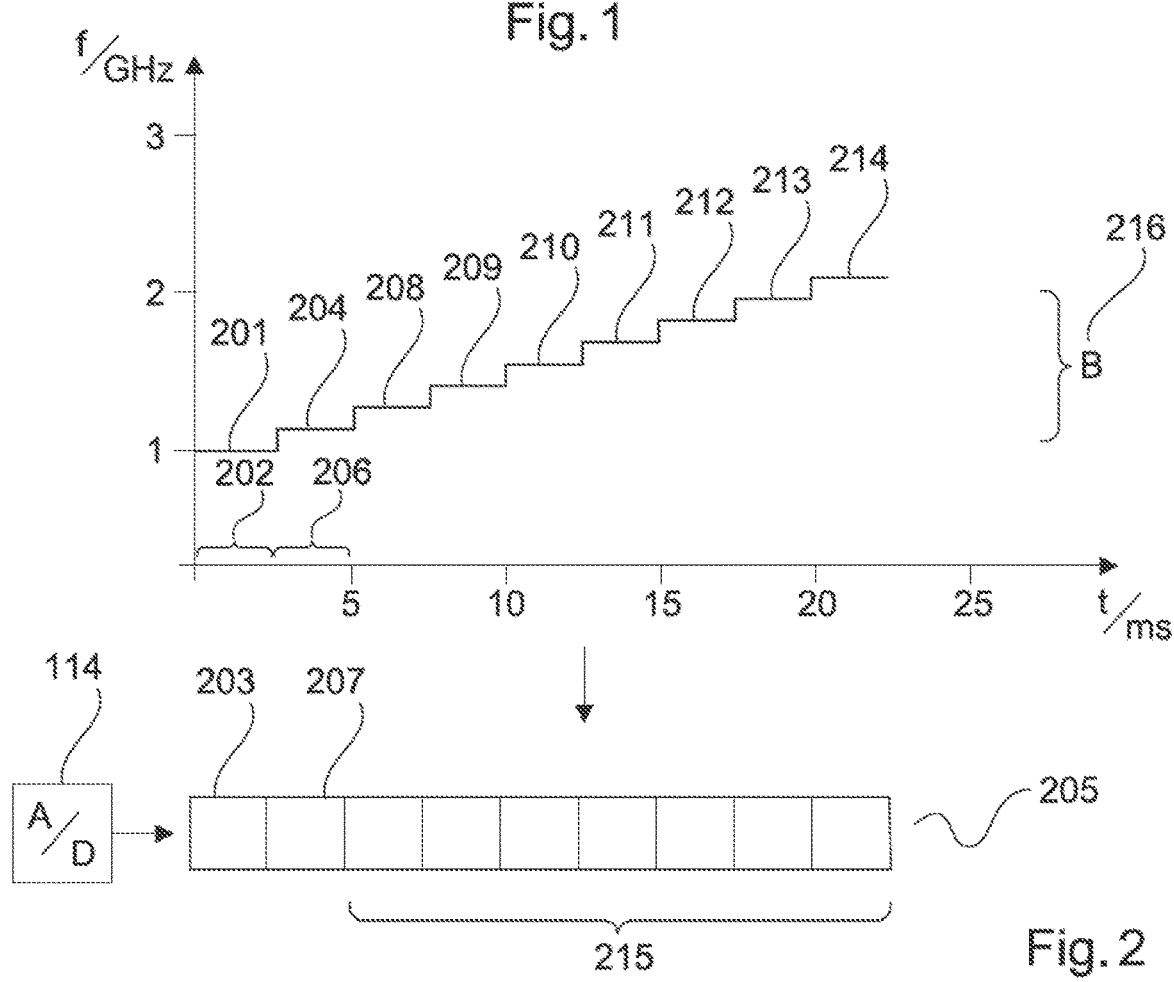
FIG. 2 shows a measurement method carried out by said measurement device.

FIG. 2 shows the frequency response curve of a transmission signal, by way of example, of the circuit layout according to FIG. 1. The fill level reflectometry sequence shown begins with setting a first frequency 201, for example of 1 GHz, at the output of the synthesiser 101. The signal is transmitted, received again, and processed in accordance with the method described above so as to determine the complex reflection coefficient. In contrast to known methods according to the FMCW principle, the system remains at the set frequency for a period of time that is longer than double the delay time of the microwave signal 104 to the reflector and back. In the present case, the specified frequency is set for a time period 202 of 2.5 ms. During said time period, the A/D convertor 114 establishes a first complex reflection coefficient 203 which is stored in the memory 205 as an in-phase component and a quadrature component or alternatively according to value and phase position. The controller unit 117 then sets a second frequency 204 on the synthesiser 101 by means of the control line 106, which frequency, in the present example, is exactly 250 MHz higher than the first frequency 201. According to the above-described model, a complex reflection coefficient value 207 is determined by the A/D convertor 114 during the time period 206 and is stored in the memory. The iterative process is continued in the same way for the sampling points 208-214, allowing the complex coefficients 215 to be determined. Characteristic values of the measurement sequence shown, according to FIG. 2, are the bandwidth B 216, which results from the difference between the highest set frequency 214 and the lowest set frequency 201, and the number of set frequencies 201, 204, 208-214.

In the example shown, the frequency spacings of all the adjacent frequency values are advantageously selected so as to be equal, such that the frequency values divide the frequency band into equidistant portions.

Figure 3:
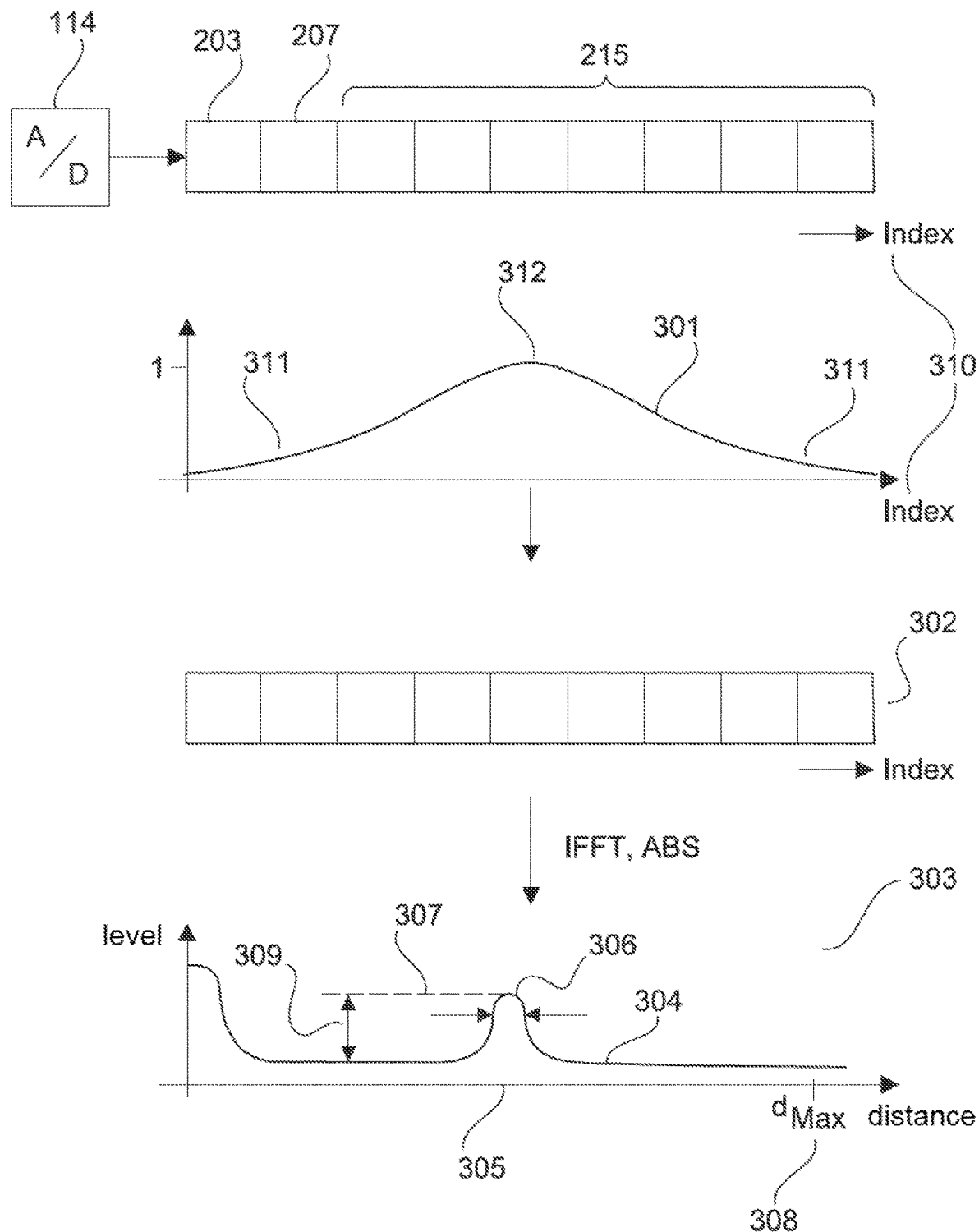
FIG. 3 shows a measurement method being executed in the control circuit.

The complex reflection coefficients 203, 207, 215 resulting from the measurement are further processed in the controller 117 of the measurement device to form the frequency points 201, 204, 208-214. FIG. 3 shows the method carried out in the controller unit 117. The coefficients 203, 207, 215 are first weighted using a window function 301 by means of multiplication. At this point, all window functions that are commonly used for spectral analysis can be applied, i.e., in particular the Chebyshev window or the Hamming window.

The window used results in the side lobes being suppressed in the subsequent transformation. The coefficients 302 that result following the windowing are transformed according to known methods of inverse spectral analysis, i.e. in particular by using an IFFT (inverse fast Fourier transform) 303, and converted into an echo curve representation, i.e. a digital representation, in the time range 304 by determining the absolute value.

Said digital time signal is in turn characteristic for the sum of the reflections of the measurement signal that is transmitted and received again. Said signal is in the form of a value table of time values and corresponding reflection portions, and can be evaluated with respect to the occurrence of local maxima. Said local maxima characterise the individual reflections of the different reflectors which were received after the corresponding time period. In this form, said time and reflection amplitude value table now resembles the digitalised reflection profiles conventional in the known fill level radar methods. Further evaluation steps for determining the searched-for echo of the filling material surface and determining the exact instant of reflection of said echo can therefore be taken from the known methods of the pulsed radar system or FMCW radar system.

The echo curve 304 shows, in particular at the point 305, a relevant level increase 306, which results from the reflection of the transmitted signal on the filling material. Important parameters of the echo curve representation are the width 307 of the echo 306, which is usually established at a level of half the maximum amplitude, and the maximum recorded measuring range dMax 308. In addition, an important criterion for assessing the reliability of the measurement is the signal-to-noise ratio 309.

The simplest principle when constructing measurement devices according to the reflectometer principle is that, in order to determine the echo curve, a predefined number of frequencies 201, 204, 208-214 are emitted according to a fixed pattern, resulting in a predefined number of measured values 203, 207, 215.

Taking this into account, it would be advantageous to design a fill level measurement device such that said device would be capable of expanding the simple control principle, and therefore of situationally achieving better measurement results and more reliable measurements.

Figure 4:
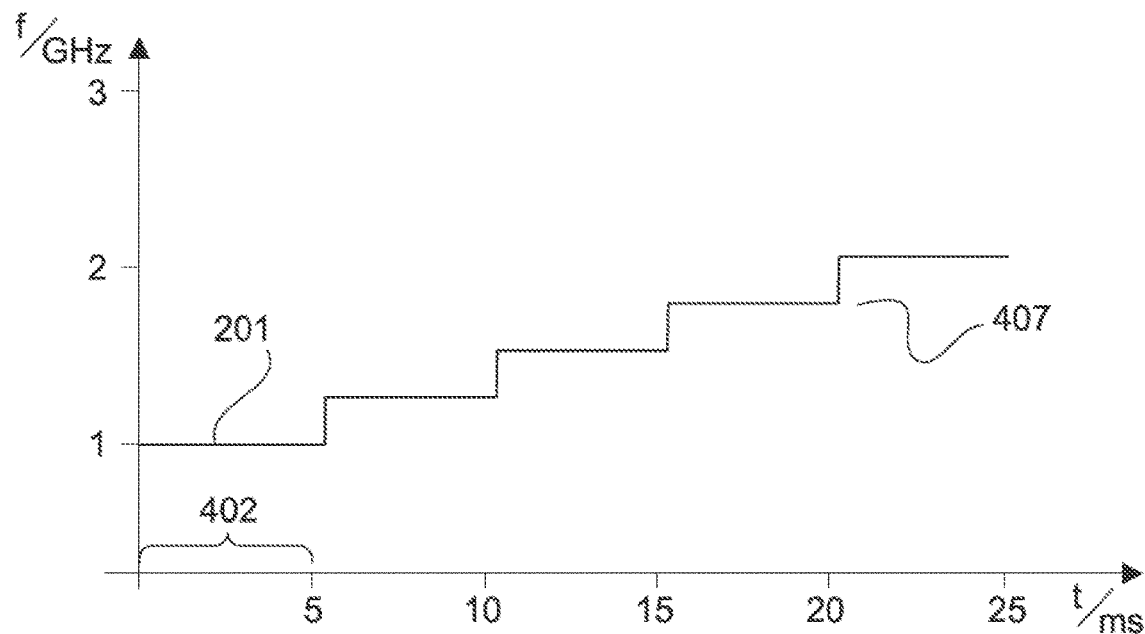
FIG. 4 shows a first operating sequence of an alternative fill level radar device.
Figure 4:
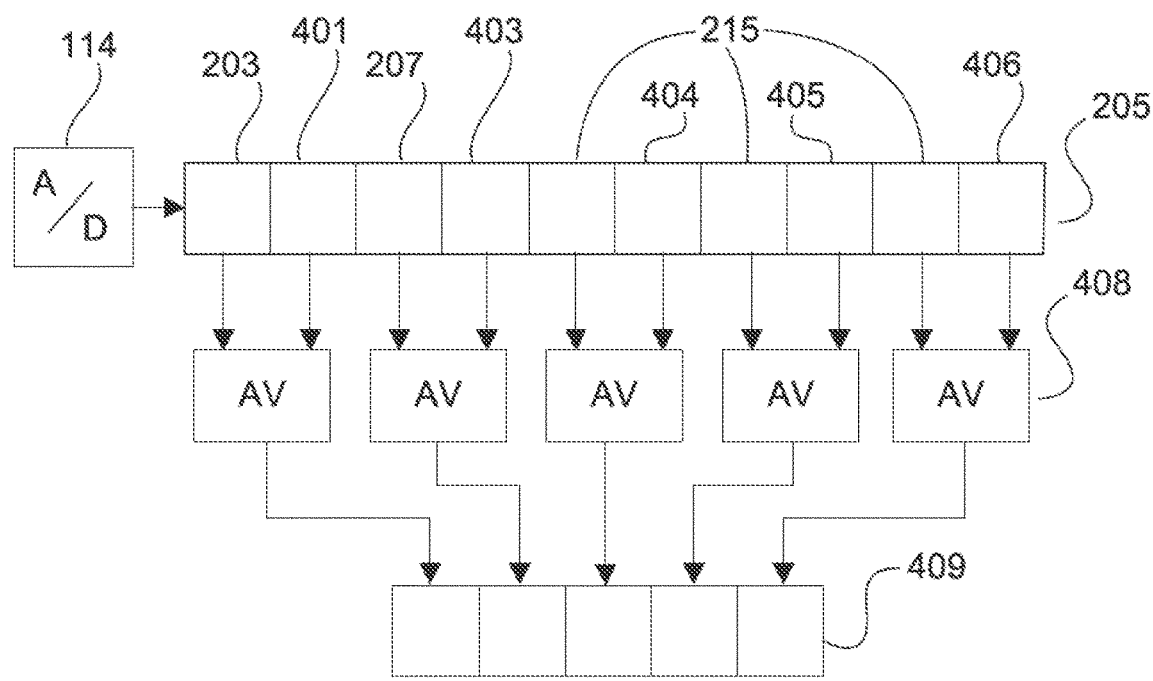

FIG. 4 shows a first alternative operating sequence of a corresponding measurement device. The proposed method can be used in particular in the case of poorly-reflective media, because said method can in particular contribute to an increase in the signal-to-noise ratio 309 in a measurement. The method makes use of the concept of applying a transmission frequency 201, which has been set once, for longer, as a result of which the A/D convertor 114 can establish a further coefficient 401, in addition to the first measurement coefficient 203, and store it in the memory. The modified controller unit 117 ensures, by means of suitable control signals 106, that the time period 402 of the application of the transmission frequency 201 is correspondingly prolonged. Corresponding additional measured values 403, 404, 405, 406 for the coefficients 207, 215 are also established and stored in the memory 205. It is thus possible for more measured values to be stored in the memory than were provided for in the embodiment from FIG. 2. However, it is also possible for the frequency differential between consecutive transmission frequencies 407 to be increased such that the same number of coefficients is determined.

In a temporally following evaluation step 408, the average value of the real part and of the imaginary part is first established from the reflection coefficients 203, 401 associated with a frequency step 201, 407, and correspondingly stored in the memory 409. The further evaluation of the signal 409 takes place according to known method steps, i.e., in particular by means of windowing, IFFT, establishing absolute values, searching for the echo and determining the distance to the echo.

Figure 5:
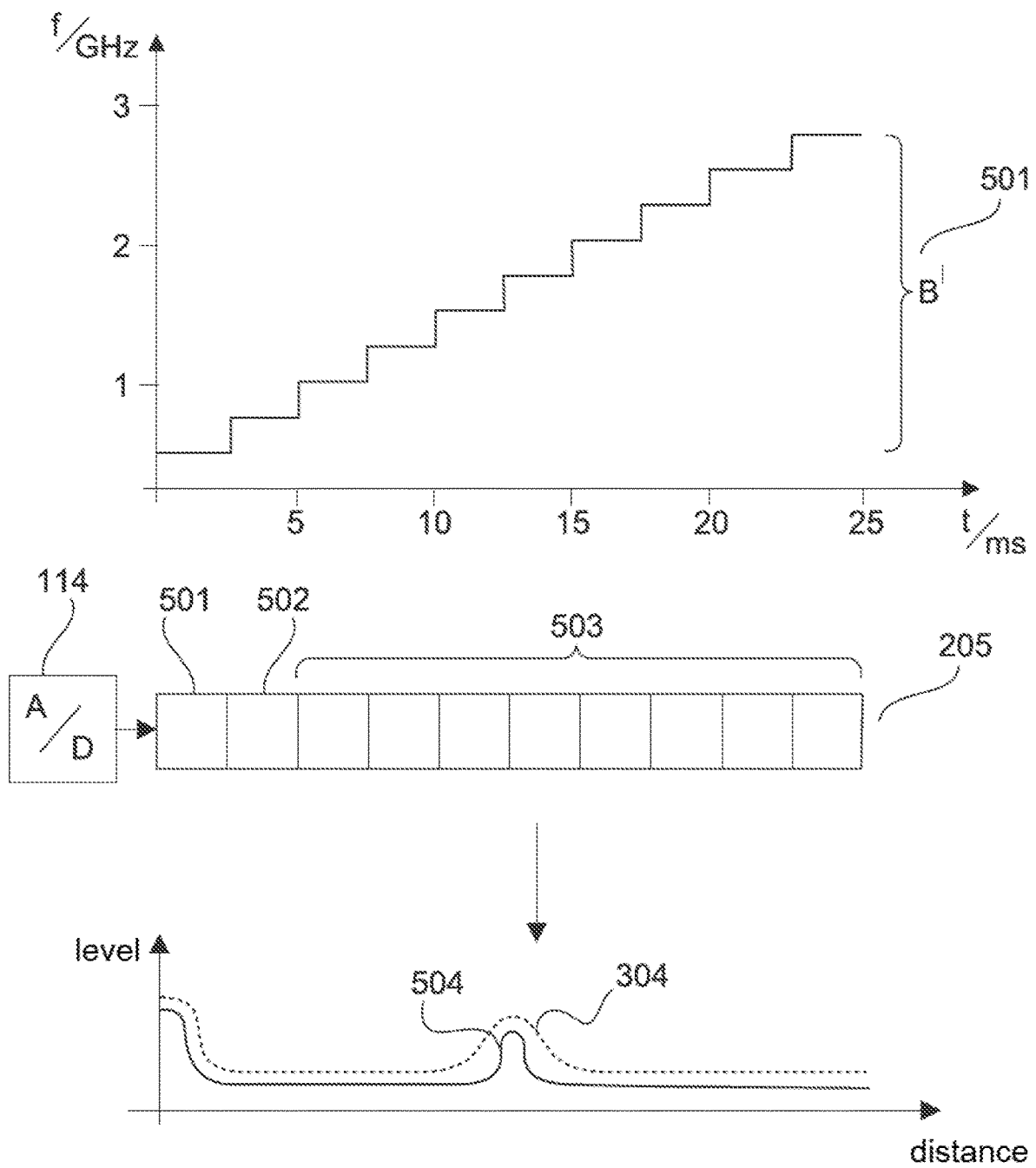
FIG. 5 shows a further operating sequence of an alternative fill level radar device.

FIG. 5 shows a further alternative operating sequence that is suitable for decreasing the width 307 of an echo 306. A smaller echo width is always advantageous if a plurality of echoes of an echo curve 304 are positioned very close to one another. This can be the case when there is a spurious echo in a container, for example. The modified controller unit 117 controls the synthesiser 101 such that, over time, said synthesiser achieves a bandwidth B' 501 that is increased in comparison with FIG. 2. The coefficients 501, 502, 503 established in this way are converted into an echo curve representation according to known methods. The echo curve 504 thus resulting has an echo of which the width is significantly reduced in comparison with the echo curve 304 established according to FIG. 2, improving the sharpness of echoes positioned close to one another.

Figure 6:
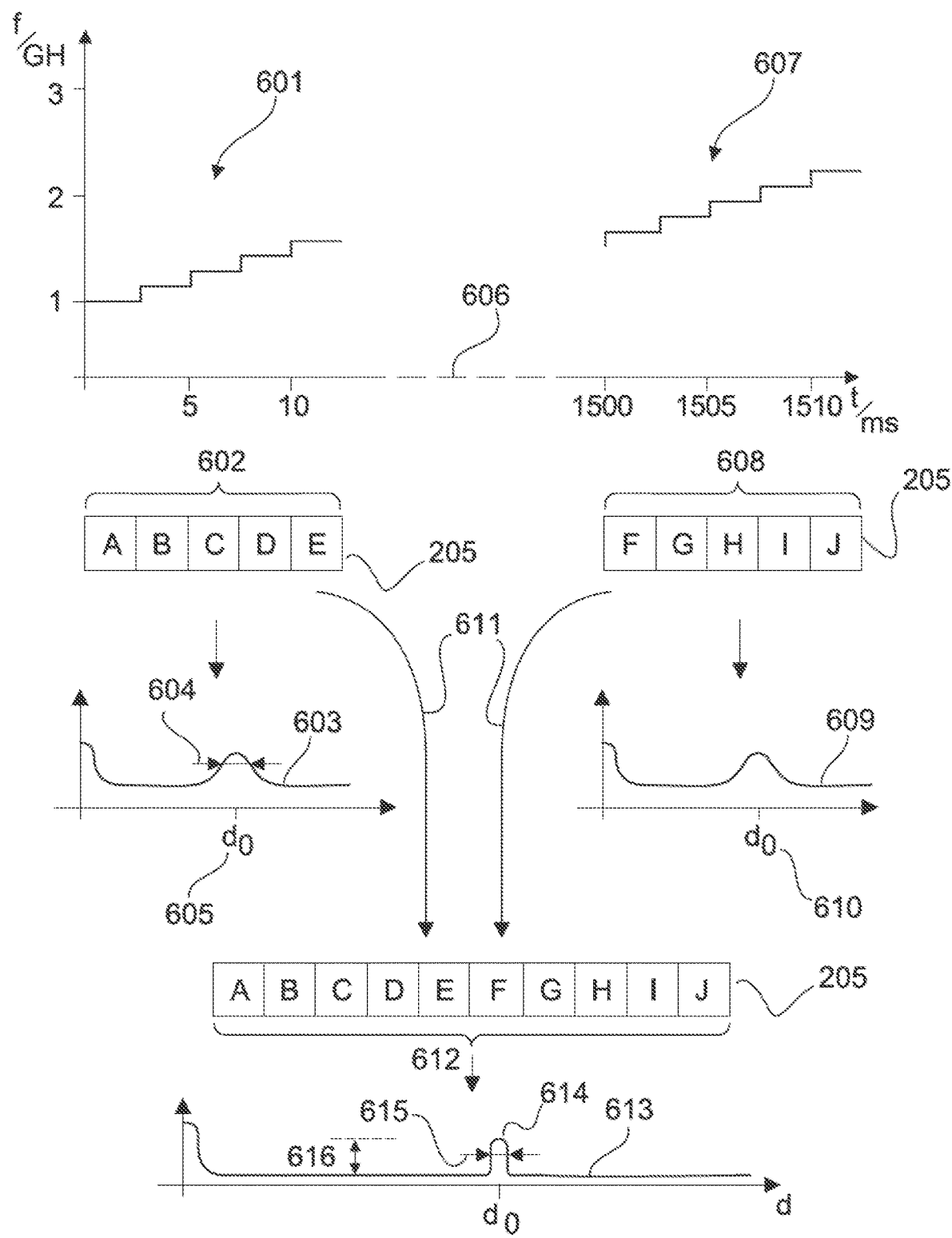
FIG. 6 shows a further operating sequence of an alternative fill level radar device.

FIG. 6 shows a further embodiment of an alternative measurement sequence. Since, in particular in the field of process automation and of supplying field devices by means of a 4-20 mA interface, which dominates said field, the power available for the measurement can be limited, providing enough power to generate high-frequency signals over a long period of time can sometimes be problematic. It is possible to deactivate the high-frequency units when there is too little energy, and to begin to collect energy in an intermediate store. As soon as said store is sufficiently filled, the high-frequency units are reactivated and a new measurement is initiated. Disadvantages of this approach are that a very large intermediate energy store is sometimes required, and that the measurement repetition rate is significantly reduced. The basic concept of the control is splitting a longer measurement into partial measurements. For this purpose, a first partial quantity 601 of transmission frequencies is first actuated. The established measured values A, B, C, D, E 602 are stored in a first portion of the memory in the sensor 602. After the high-frequency units have been deactivated, a first echo curve 603 having a first echo width 604 can be established therefrom, and a first measured value 605 can also be provided. After an appropriate measurement pause 606, the high-frequency unit is reactivated and a second partial quantity 607 of transmission frequencies is emitted, allowing a second quantity of reflection coefficients F, G, H, I, J 608 to be established. The newly established coefficients can in turn be converted into an echo curve 609 and a measured value 610. In a further step 611, the reflection coefficients 602 of a first measurement and the coefficients 608 of a second measurement are combined in the memory 205, and undergo a joint evaluation. The echo curve 613 established from all the coefficients A, B, C, D, E, F, G, H, I, J 612 can in turn be examined for echoes, the echoes 614 of the echo curve 613 showing clear improvements in comparison with the partial results of the echo curves 603, 609, both with respect to the width 615 of said echoes and with respect to the signal-to-noise ratio 616. However, the method still allows for a very high measurement repetition rate by means of the early provision of measured values.

Figure 7:
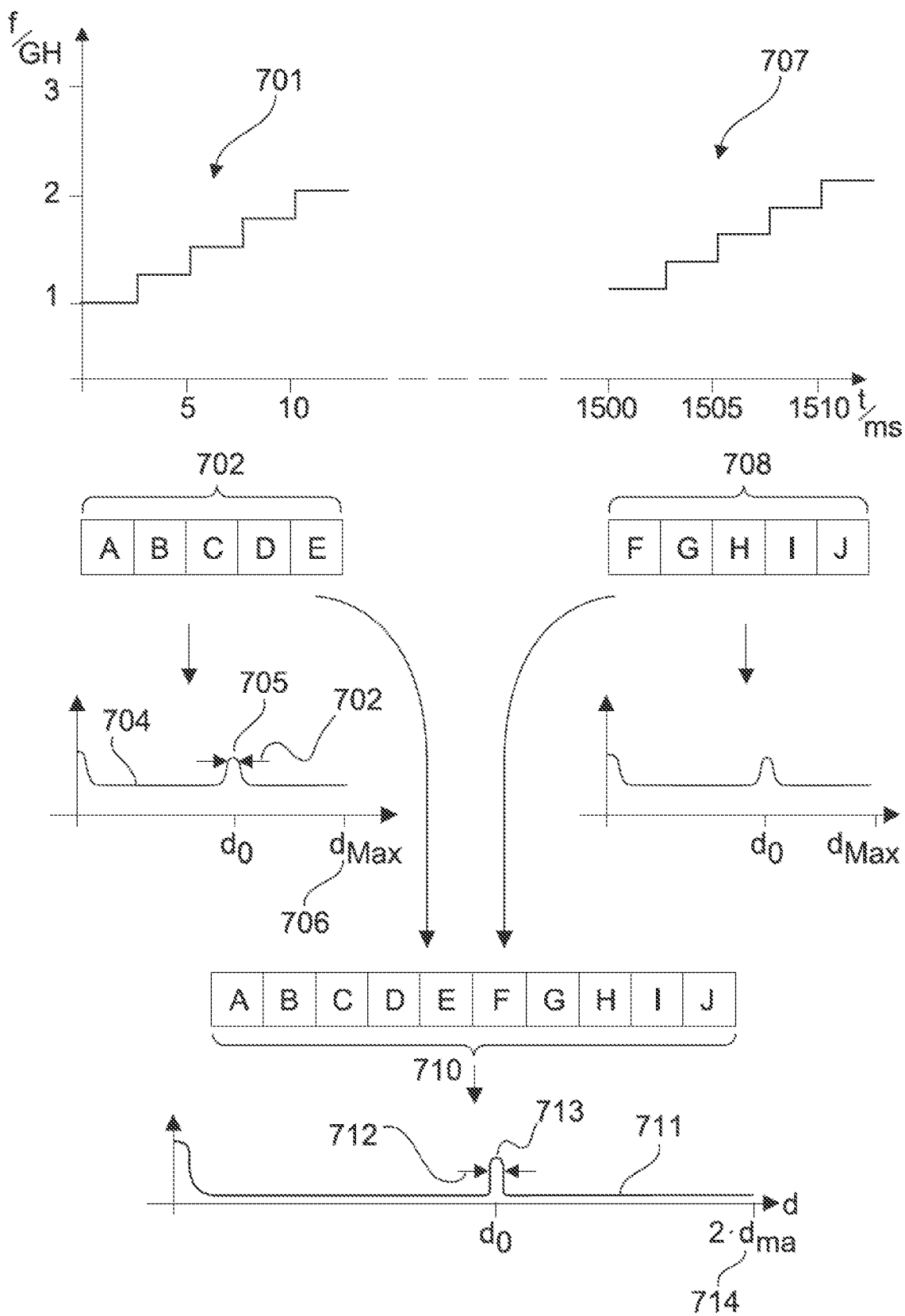
FIG. 7 shows a further operating sequence of an alternative fill level radar device.

FIG. 7 shows a further modification of the partial-measurement method according to FIG. 6. In contrast to the partial quantities of transmission signals 601, the measurement frequencies 701 generated by the synthesiser are spaced further apart from one another. After the reflection coefficients A, B, C, D, E 703 have been correspondingly converted into an echo curve 704, an echo 705 can be directly established, the width 702 of which corresponds to the echo 614 of the echo curve 613. A very high degree of sharpness for echoes positioned very close to one another is thus already obtained on the basis of a first partial measurement. This advantage is achieved in that the maximum distance 706 that can be established in the echo curve 704 is exactly half the maximum distance of the echo curve 603. After a second partial measurement 707 has been carried out, the transmission frequency values of which lie exactly between the those of the first measurement, and a second quantity of coefficients F, G, H, I, J 708 has been established, coefficients of a plurality of measurements A, F, B, G, C, H, D, I, E, J 710 can in turn undergo a combination process 709, which coefficients can be converted into an echo curve 711. At this point, it should be noted that the coefficients should be appropriately sorted before the spectral analysis. The echoes 713 of the echo curve produced in this way are, with respect to the width 712 thereof identical to the echoes of the echo curves of the two partial measurements. However, combining the two partial measurements doubles the maximum display range 714 of the echo curve 711.

Converting the coefficients 203, 207, 215 into an echo curve representation 304 according to known methods includes, as already mentioned above, weighting by means of a window function 301. With regard to the question of the necessary accuracy when determining the reflection coefficients, it may be a finding of the present invention that the impact of an inaccuracy in a measured coefficient 203, 207, 215 depends on the position of said coefficient, i.e., in particular on the index 310 of said coefficient with respect to the window function 301. Measurement inaccuracies in the edge regions 311 do not have such a strong effect on the end result as measurement inaccuracies in the central region 312 of the window function.

Figure 8:
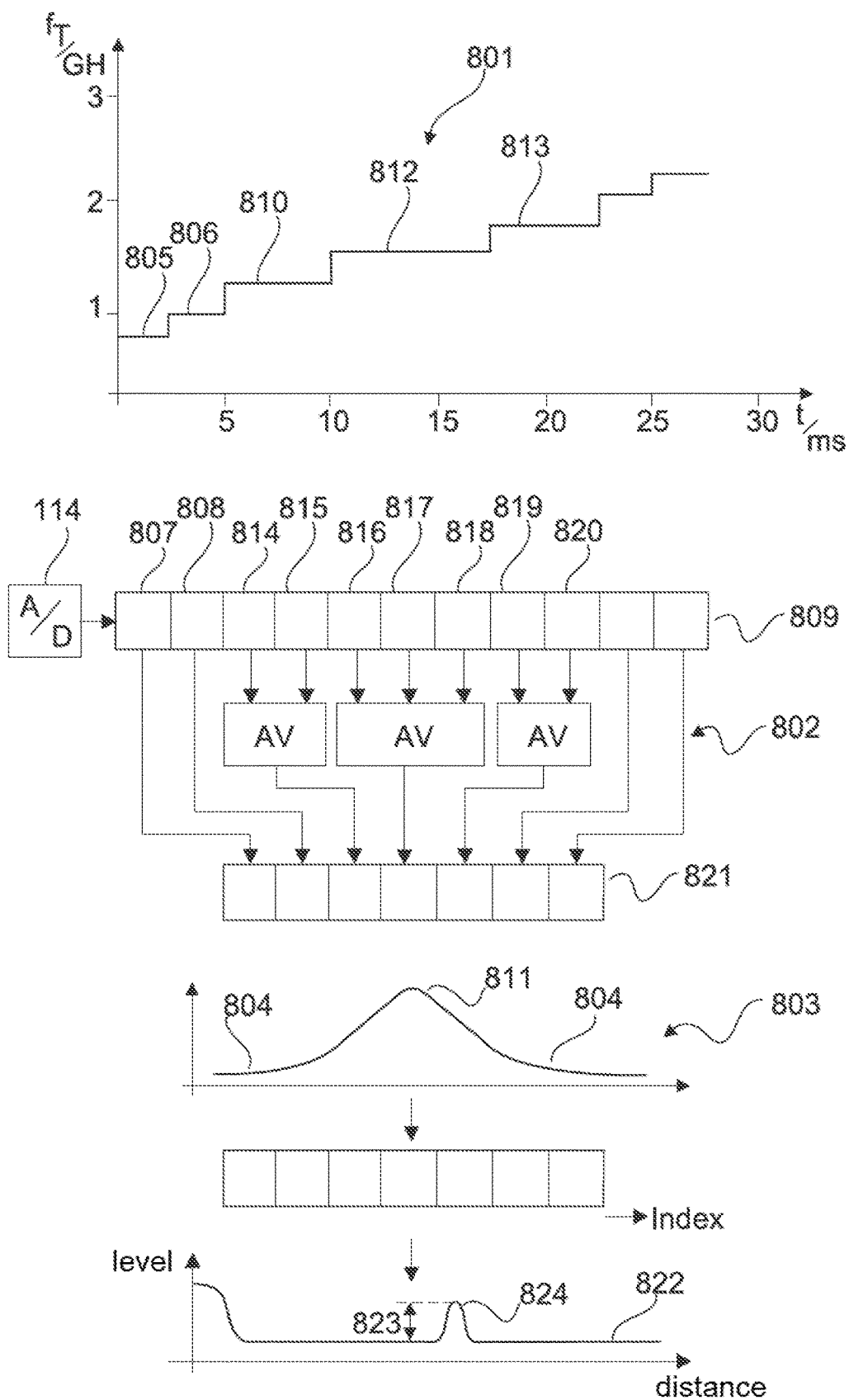
FIG. 8 shows a further operating sequence of an alternative fill level radar device.

FIG. 8 proposes an actuation function 801 and an evaluation concept 802, which make use of this fact. Frequencies 805, 806 are emitted in the region of the window edges 804. Since the accuracy requirements are not particularly high here, it is sufficient to establish one measured value 807, 808 in each case and store it in the memory 809. If the method approaches the window centre 811, the synthesiser is actuated by the controller circuit so as to allow the corresponding transmission frequency values 810, 812, 813 to be applied for longer. This allows the controller circuit 117, together with the A/D converter 114, to establish a plurality of measured values 814, 815, 816-820 for the reflection coefficients, and to store them in the memory. In a subsequent signal processing step, the values that were detected at the same transmission frequency in each case are first averaged on the basis of the individual measured values for the reflection coefficients. The accuracy of the coefficient determination 821 in the central region 811 of the window function 803 can be significantly increased thereby. The coefficients 821, optimised for accuracy, are subsequently converted, in accordance with known methods, into an improved echo curve representation 822, the echoes 824 of which have an increased signal-to-noise ratio 823. At the same time, the sequence described can prevent a large amount of energy and measurement time being lost on irrelevant marginal coefficients, which contributes to improving the measurement repetition rate overall.

The approaches set out above for intelligent actuation of the synthesiser unit 101 can also be combined in a further embodiment.

Figure 9:
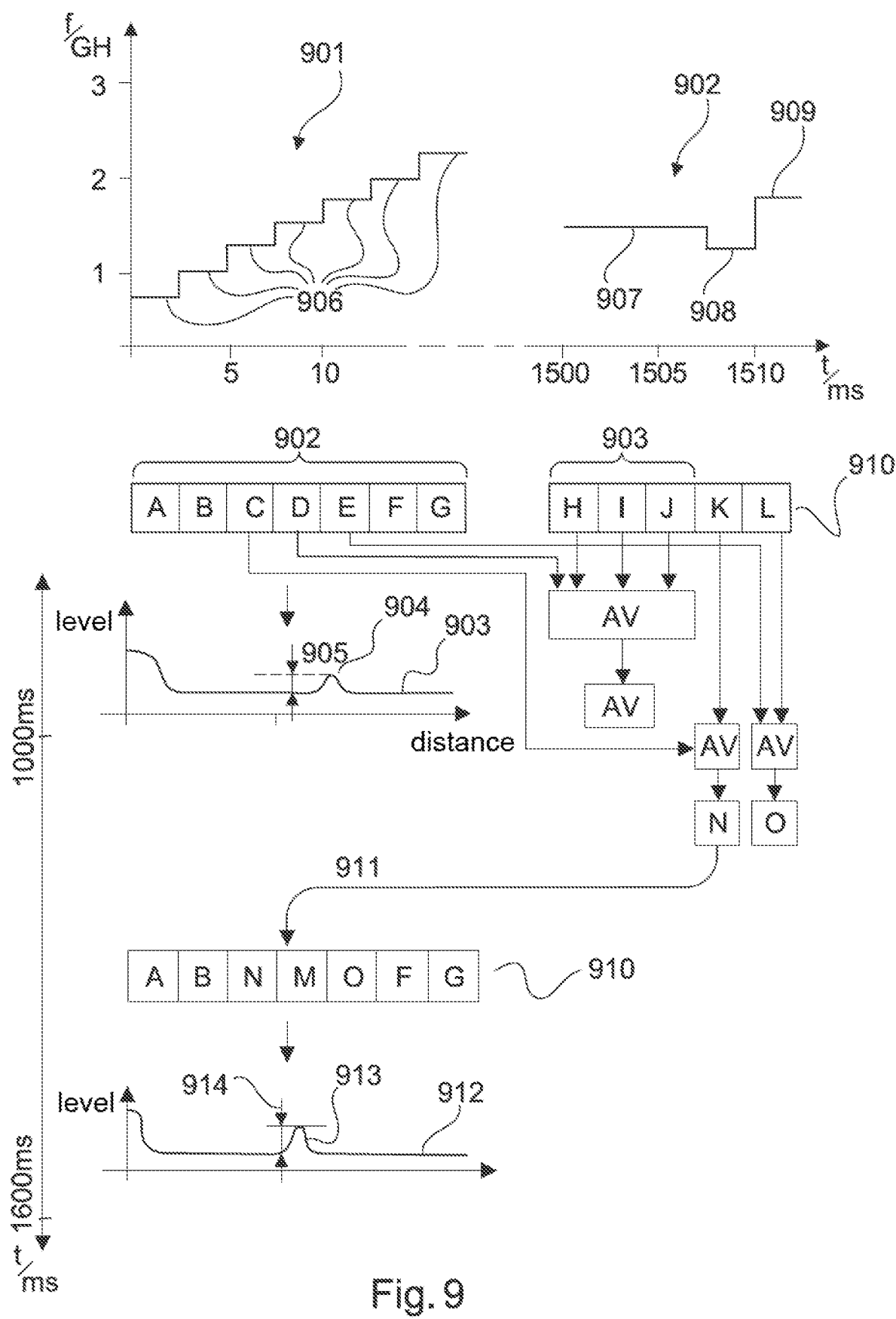
FIG. 9 shows a further operating sequence of an alternative fill level radar device.

FIG. 9 shows an example of an actuation function having substantially random frequency preselection. In a first measurement process 901, the modified controller unit actuates the synthesiser such that said synthesiser implements a conventional measurement sequence. The established coefficient values A, B, C, D, E, F, G 902 can be transformed, in accordance with known methods, into a first echo curve 903. The first echo curve may have a first echo 904 that has a first signal-to-noise ratio 905. In order to improve the signal-to-noise ratio 905 in the case of poorly-reflective media, further measurements according to diagram 901 can be carried out. If a plurality of measurements are averaged during the signal processing of the coefficients 902, the signal-to-noise ratio of the echo increases. However, a disadvantage in this case is that the measurement time is significantly increased, which leads to problems in particular in the case of very quick changes in fill level. The measurement sequence 902 provides an improvement here. Similarly to the representation 801, the underlying concept here too is that the central coefficient values C, D, E should be determined with a higher degree of accuracy. Since a particular advantage of a fill level measurement method according to the reflectometer principle is that the individual frequency values 906 can be set completely freely and independently of one another, only the frequency values 907, 908, 909 on the basis of which reflection coefficients having a higher degree of accuracy are required are actuated in the second measurement process 902. A further advantage of the invention may be that the duration for which a transmission frequency is applied can be set.

In this way, it may be possible to apply the value of the transmission frequency 907 for longer than is the case for other transmission frequencies 908, 909. Applying said value for longer results in the possibility of detecting a plurality of measured values for the corresponding reflection coefficients H, I, J 909 for the corresponding step 907 by means of the A/D converter 114, and saving them in the memory 910. According to the described embodiments, within the context of the signal processing, the measured values of the reflection coefficients which were detected at the same transmission frequency 906, 907, 908, 909 are averaged and arranged again in the memory. Therefore, for example for the second evaluation 911, the central coefficient value M results as the average value of the corresponding measured values D, H, L J. The coefficient values N and O likewise result from averaging, whereas the coefficients A, B, F, G are taken, unchanged, from the first After the coefficient arrangement 910 resulting in this way has been converted into an echo curve 912, said curve is in turn examined for echoes. It is apparent that the echo 913 has a significantly improved signal-to-noise ratio 914 in comparison with the echo 904, which contributes to a significant improvement in the reliability of the measurement device in particular in the case of poorly reflective media. At the same time, an increase in the measurement repetition rate can be achieved by means of the measurement sequence according to the described embodiments, which increase can likewise contribute to improving the reliability of the measurement, in particular in containers having very quick changes in fill level.

The embodiments set out above show that the invention can be used to define a measurement device, a measurement sequence and a corresponding evaluation strategy that can dynamically adapt to changing ambient conditions and/or user specifications. In comparison with known FMCW methods which do not provide for random setting of a sequence of transmission frequencies, the fill level measurement device according to the outlined reflectometer method, combined with the disclosed principles, has the significant advantage of being able to react very flexibly to a wide variety of application and user specifications. In particular, it is possible for the measurement device to set and/or change the described modes of operation, and further modes, fully automatically and independently, in accordance with previously registered events.

With regard to the functional block diagrams and schematic drawings, it should be noted, in general, that said diagrams and drawings are reduced to the essential components, and components required for practical implementation have been omitted in part or simplified, since they are known to a person skilled in the art. This applies, for example, to filtering measures at the output of the mixer in order to allow through only the desired mixed frequencies and to suppress undesired mixed products. Furthermore, amplifying signals when necessary at different points of the signal chain in order to increase the signal-to-noise ratio is routine for a person skilled in the art. These can be, for example, amplifiers in the transmitting branch or upstream of the receiving mixer in the receiving branch. Moreover, only the part of the sensor circuit important for direct measurement technology has been shown here. A fill level radar sensor constructed according to this principle may of course contain further circuit parts that are known to a person skilled in the art. For the sake of completeness, it should be noted that "comprising" and "having" do not exclude the possibility of other elements or steps, and the indefinite articles "one" or "a" do not exclude the possibility of a plurality.

It should also be pointed out that features or steps described with reference to one of the above embodiments may also be used in combination with other features or steps of other above-described embodiments. Reference signs in the claims should not be considered limiting.

We claim:

1. A fill level measurement device for fill level measurement in accordance with a reflectometer method, the device comprising:
   a signal source assembly configured to generate an electromagnetic transmission signal during a fill level measurement phase,
   wherein the electromagnetic transmission signal is frequency-modulated in steps,
   wherein each step of said steps has a constant frequency over a period of time that is more than twice that of a delay time of the electromagnetic transmission signal from the signal source assembly to a filling material, and
   wherein individual constant frequencies of the electromagnetic transmission signal are distributed within a defined frequency band; and
   a control circuit configured to change a number of the steps, frequency spacings between individual steps, durations of the individual steps, a width of the defined frequency band, a frequency of a lowest step, or a frequency of a highest step,
   wherein steps in a central region of the defined frequency band of the electromagnetic transmission signal last longer than steps in edge regions of the defined frequency band of the electromagnetic transmission signal.

2. The fill level measurement device according to claim 1, wherein the control circuit is further configured to generate the electromagnetic transmission signal in at least two partial signals that are temporally separated from one another, between transmission of which partial signals towards the filling material the signal source assembly is deactivated.

3. The fill level measurement device according to claim 2, wherein frequencies of the steps of a second partial signal of the at least two partial signals are between frequencies of the steps of the first partial signal.

4. The fill level measurement device according to claim 1, wherein the control circuit is further configured to carry out the change using characteristic variables, which have been input by a user or which have been detected by the fill level measurement device.

5. The fill level measurement device according to claim 1, further comprising:
   a transceiver circuit, configured to:
      transmit the electromagnetic transmission signal towards a filling material surface;
      receive a reflected electromagnetic transmission signal reflected from the filling material surface; and
      perform heterodyne mixing of the received reflected electromagnetic transmission signal with a signal of a further signal source assembly so as to form a reflection-dependent reception signal from which the fill level can be determined.

6. The fill level measurement device according to claim 1, wherein the control circuit is further configured to determine exactly one fill level measurement value during the fill level measurement phase.

7. A method for fill level determination in accordance with a reflectometer method, comprising the following steps:
   starting a fill level measurement phase;
   generating an electromagnetic transmission signal during the fill level measurement phase,
   wherein the electromagnetic transmission signal is frequency-modulated in steps,
   wherein each step of said steps has a constant frequency over a period of time that is more than twice that of a delay time of the electromagnetic transmission signal from the signal source assembly to a filling material, and
   wherein individual constant frequencies of the electromagnetic transmission signal are distributed within a defined frequency band;
   determining the fill level from data acquired during the fill level measurement phase;
   changing a number of the steps, frequency spacings between individual steps, durations of the individual steps, a width of the defined frequency band, a frequency of a lowest step, or a frequency of a highest step,
   wherein steps in a central region of the defined frequency band of the electromagnetic transmission signal last longer than steps in edge regions of the defined frequency band of the electromagnetic transmission signal.

8. A nontransitory computer-readable storage medium having a program stored therein, which, when executed on a processor of a fill level measurement device, instructs the fill level radar device to perform a method according to claim 7.

* * * * *